Sept. 22, 1931.  C. W. LAMBERT  1,824,022
KNIFE

Filed March 10, 1930

Chandley William Lambert
INVENTOR.

Patented Sept. 22, 1931

1,824,022

UNITED STATES PATENT OFFICE

CHANDLEY WILLIAM LAMBERT, OF CLEVELAND, OHIO

KNIFE

Application filed March 10, 1930. Serial No. 434,765.

The invention relates to improvements in knives having a comparatively thin tang embedded in a plastic handle; and the object of the improvement is to provide a means whereby the tang will be securely held by the plastic handle without loosening or shearing.

One form of the invention is shown in the accompanying drawings in all figures of which the same parts are lettered the same.

Figure 3:
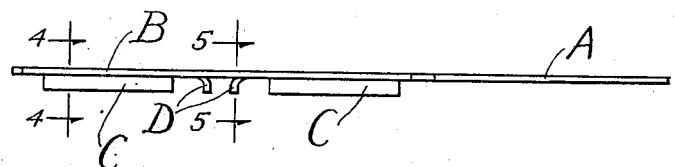
Figures 4, 5:
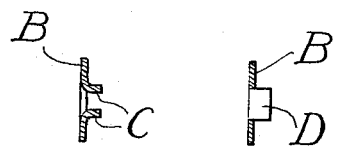

Fig. 3 is an edge elevation of the tang B and Figs. 4 and 5 are cross-sections of the tang B along lines 4—4 and 5—5 respectively of Fig. 3.

Figure 1:
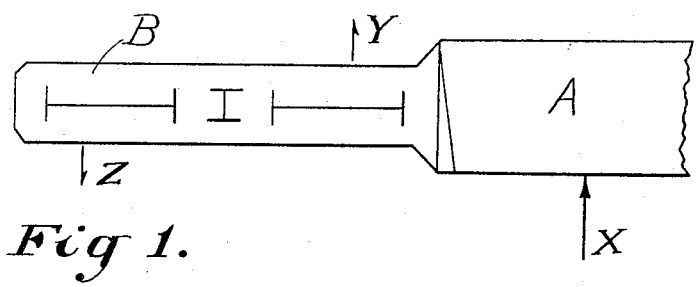
Fig. 1 is a side elevation of the tang B in blank form, showing the position of three H shaped cuts, the middle cut being transversely of the tang.

The resistance, of the material being cut, reacts against the edge of the blade A, Fig. 1, at X, in the direction of the arrow. This has a tendency to cause a thin tang to shear upward through a plastic handle at Y, and at the other end of the tang to shear downward, as at Z.

Figure 2:
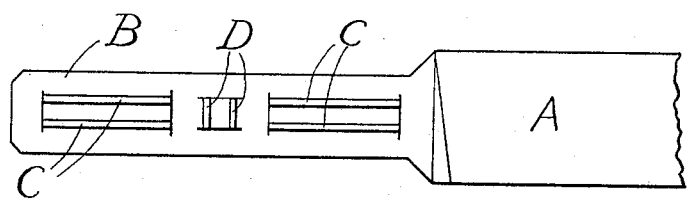
Fig. 2 is a side elevation of the tang B, showing the development of the idea; the tang material above and below the bar of the H shaped cut being bent out to form flanges at an angle to the plane of the tang.

This shearing tendency is overcome by longitudinal flanges C—C, Figs. 2—3—4, which are bent out at an angle to the face of the tang.

The transverse flanges D—D Figs. 2—3—5, are to prevent shearing or loosening due to end thrust on the blade A.

The total area of the openings through the tang should be as large as consistent with the desired tang rigidity and strength, in order that the two sides of the plastic handle may be solidly joined together.

The scope of this invention is not restricted to the form shown in the drawings, nor the number and size and shape of the flanges. The form shown in the drawings is recommended because of its simplicity. The flanges may be bent out all on one side of the tang, or part on each side.

Having thus described the invention, I claim,

A knife tang for use with a plastic handle, said tang having two longitudinal H shaped cuts and a central transverse H shaped cut, the flanges of said H shaped cuts being pressed outwardly at an angle to the face of said tang, said tang and said flanges forming bearing surfaces for the reception of the plastic material of said plastic handle, said bearing surfaces being so disposed as to prevent shearing of said plastic handle by said tang.

CHANDLEY WILLIAM LAMBERT.